April 12, 1938.   D. BROWN   2,113,717
METHOD AND MACHINE FOR MAKING CLAY SHINGLES
Filed May 29, 1935   5 Sheets-Sheet 1
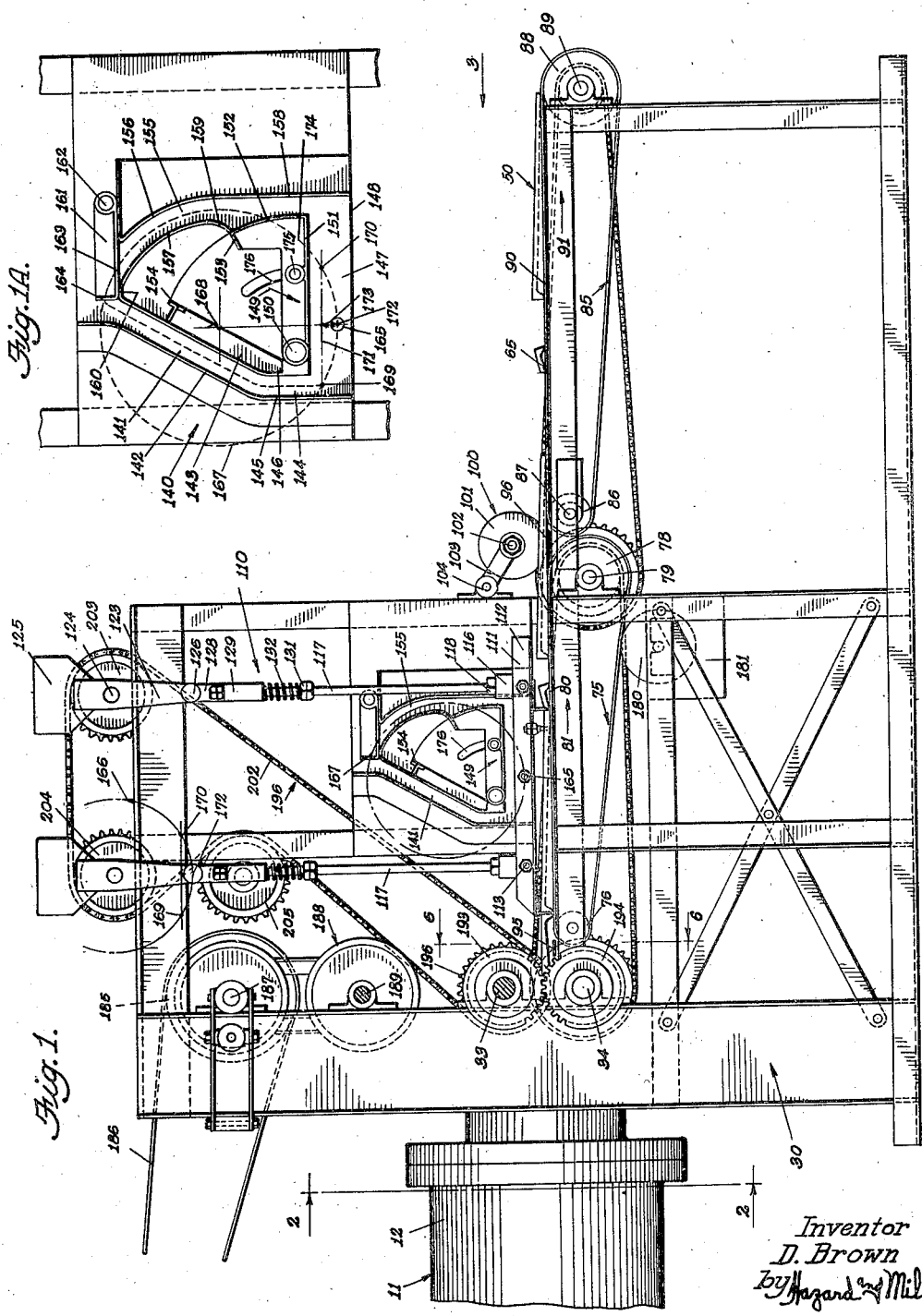
Inventor
D. Brown
by Hazard and Miller
Attorneys.

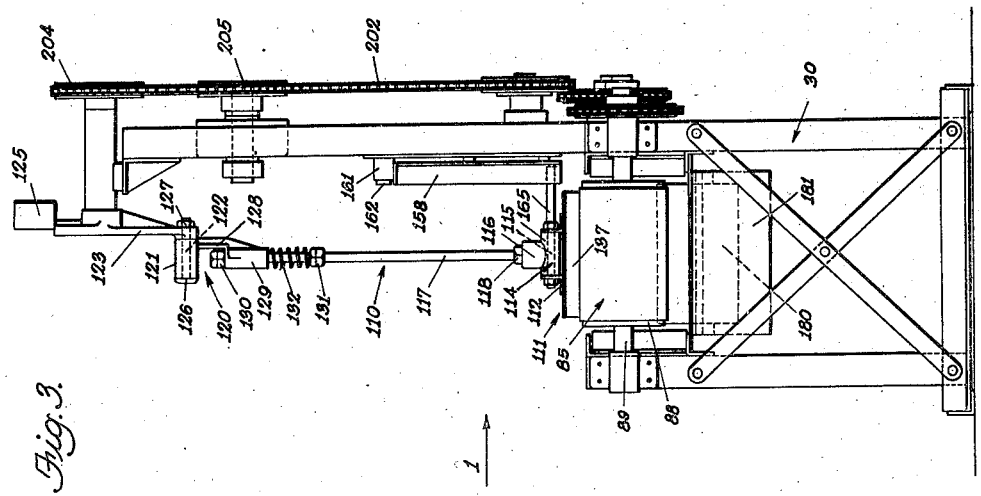

April 12, 1938.                D. BROWN                2,113,717
METHOD AND MACHINE FOR MAKING CLAY SHINGLES
Filed May 29, 1935           5 Sheets-Sheet 3
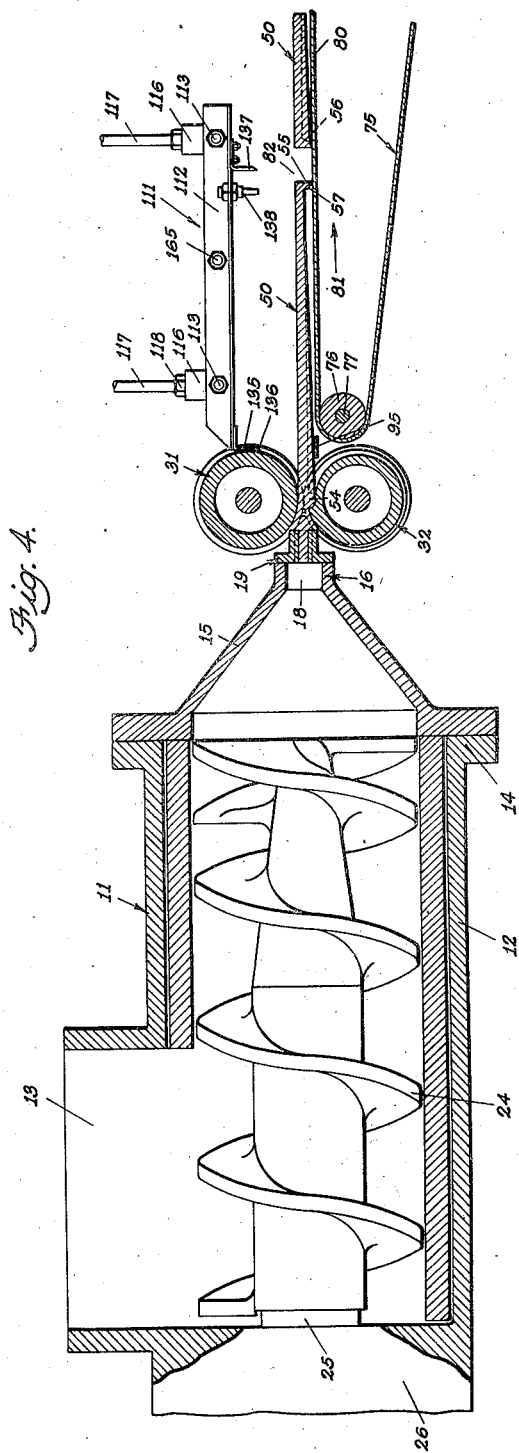
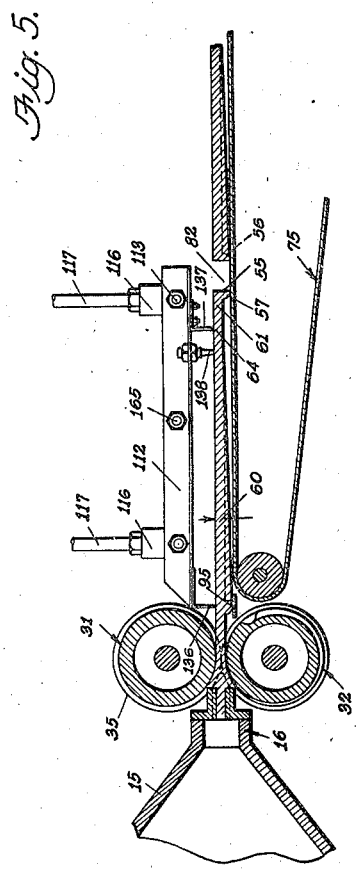
Inventor
D. Brown
by Hazard and Miller
Attorneys.

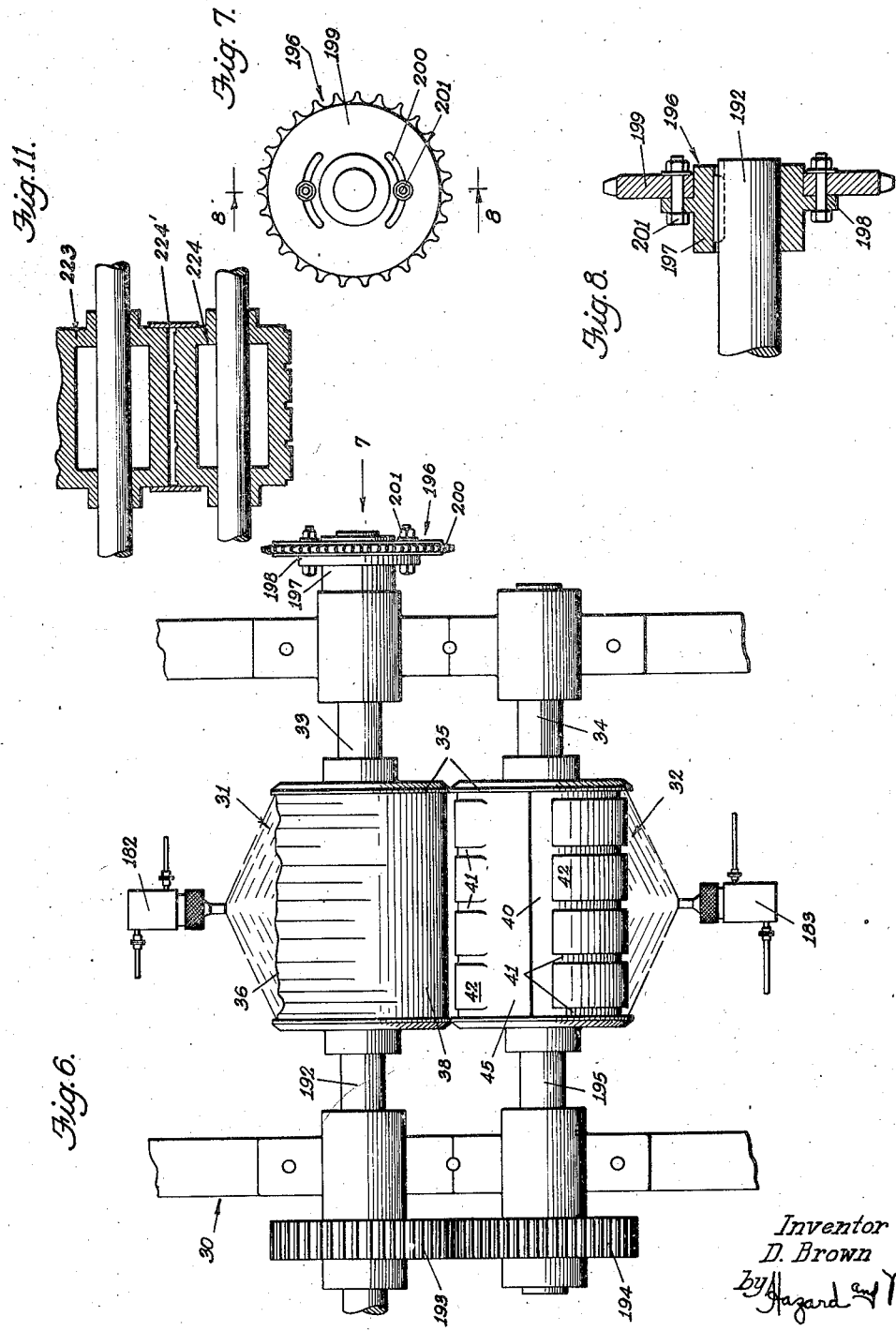

April 12, 1938.    D. BROWN    2,113,717
METHOD AND MACHINE FOR MAKING CLAY SHINGLES
Filed May 29, 1935    5 Sheets-Sheet 5
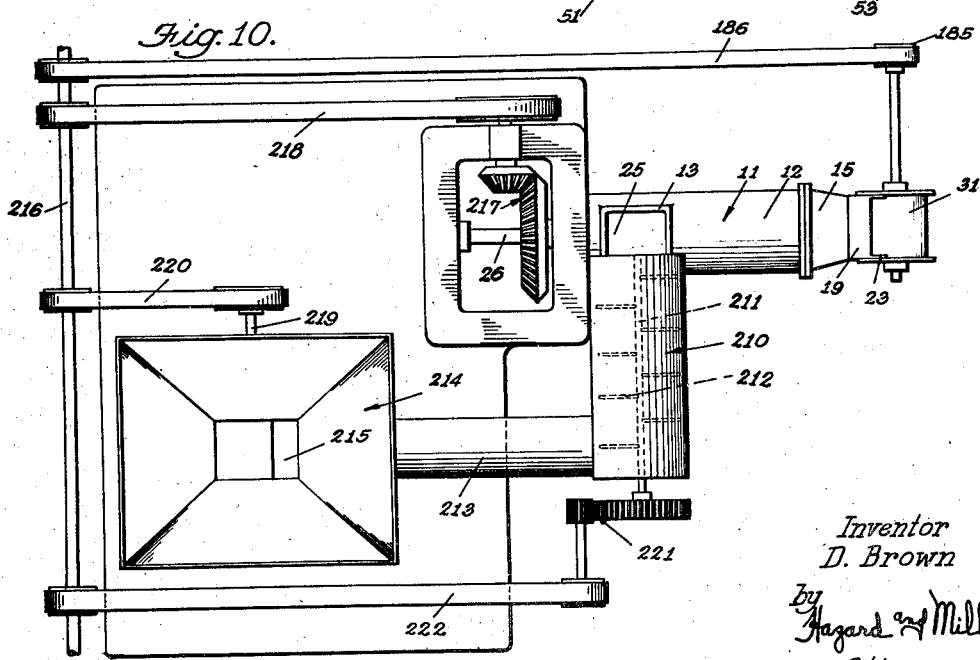

Patented Apr. 12, 1938

2,113,717

UNITED STATES PATENT OFFICE 2,113,717

METHOD AND MACHINE FOR MAKING CLAY SHINGLES

Davis Brown, Los Angeles, Calif.

Application May 29, 1935, Serial No. 24,069

9 Claims. (Cl. 25—42)

My invention relates to a clay shingle having new and improved characteristics, and broadly by the term shingle I mean any type of plastic product which may be hardened, which has the characteristic of a shingle of being thicker at the butt than at the opposite or small end, and thus having a taper.

My invention also includes a new method of working clay or similar plastic to develop a shingle and in the machine with the cutters used in the manufacture of the shingle. My present invention has a number of new features as to the shingle, the method and the machine over my prior patent for a Shingle machine, No. 1,894,394, patented January 17, 1933.

In regard to the shingle, an object and feature of my invention is forming a light, compactly pressed and strong shingle having a pronounced thick butt and tapered to the small end, in which the taper is provided by longitudinal ribs extending from a thick transverse bead or butt and towards the small end; the ribs being on the underside. The web of the shingle is comparatively thin and substantially of the same general thickness throughout. The upper surface of the shingle is characterized by having a more or less deeply grooved and ribbed upper surface, the grooves and ribs being slightly irregular to simulate hand hewn shakes. Also if desired, the upper surface may have a plurality of designs, such as the roof or grooved surface simulating the shakes, a criss-cross design or a smooth surface. All of these may be on the same shingle and they may be varied in position in accordance with the design it is desired to expose when laying out the shingles.

A further characteristic of the upper surface design of the shingle is that the surface finish may be produced in part by the configuration of extrusion die rolls and in part by the slippage or extrusion under pressure of the plastic through the rolls at a higher lineal speed than the peripheral speed of the periphery or pattern surface of the roll. This gives a slight elongation to the design, causing it to differ in the shingle when so desired, from the design formed when the lineal speed of the shingle and the peripheral surface of the die roll are the same.

Another feature of my invention relates to forming the extrusion rolls to make the circumference slightly less than the shortest shingle the machine is designed to make, plus a necessary waste piece at the small end. Thus there is a slight elongation of the clay ribbon from the extrusion press due to the difference of the cross sectional area of the shingle adjacent the butt and adjacent the small end. Then when longer shingles are desired, the peripheral speed of the rolls is reduced so that the extrusion press causes a distinct slippage of the clay through the bite of the rolls and thus develops the desired elongation and slightly alters the upper surface pattern. The operation of the cutting knives is so regulated and timed with the rolls as to form a main or primary cut at the butt end and a secondary cut adjacent the small end, thereby developing a slight wastage piece between the small end of one shingle and the butt end of the next proceeding shingle. By forming a thick transverse bead or rib I may develop a shingle having the appearance of an unusually thick end which is highly desirable as being ornamental when the shingles are laid.

Another feature of my invention as to the method and machine involves supporting the leading end of the clay ribbon on a moving conveyor, operating at a surface speed slightly higher than the peripheral speed at the bite of the rolls, whereby a slight tension or pull is developed on the ribbon, thus preventing the extrusion press and the rolls from bringing compressive stresses on the thin die pressed ribbon which might cause a buckling. However, in order to avoid too great a tension, the upper surface of the conveyor is lubricated.

Another object and feature of my invention relates to the method of cutting the extruded clay to form the separate shingles. This involves forming a first cut at the butt end of the shingle immediately as it leaves the extrusion die rollers, this cut being made through preferably a thickened flange or butt end bead. This cut is made while the leading end of the succeeding shingle is being fed towards the endless belt conveyor and hence the severed shingle may be fed away from the succeeding shingle being extruded and thereby avoid any end pressure on such succeeding shingle.

A further object and feature of my invention involves maintaining the cutting knives both for making the butt and the small end cut always transverse to the extruded shingle, that is being at right angles to the upper surface of the shingle. This feature involves bringing the cutting knives into contact with the shingle while being extruded from the press and the die rollers and having the leading or small end supported on the relatively high speed conveyor belt. These knives are given a combined motion transverse to the shingle to make square cuts at both ends of the shingle and at the same time the knives travel longitudinally at the same speed as the progressive movement of the shingle so that the cut is gradually made while the clay forming the shingle is traveling after being extruded and die pressed to the desired shape on the upper and lower surfaces.

Another feature of my invention relates to associating with the cutting knives, a plurality of punches, these being spaced from the knife cutting the small end. These punches operate in the same manner as the knives to form perforations in the small end of the shingle to provide nail holes. The punches are manipulated to have the combination transverse and longitudinal movement in order that the clay of the shingle be not distorted where the holes are punched.

My invention is illustrated in connection with the accompanying drawings, in which, Fig. 1 is a side elevation of my invention taken on the section line 1—1 of Fig. 2 in the direction of the arrows or in the direction of the arrow 1 of Fig. 3.

Fig. 1a is an enlarged elevation of the cam guide and associated parts of Fig. 1.

Fig. 2 is a vertical section on the line 2—2 of Fig. 1 in the direction of the arrows, the extrusion screw being omitted from the extrusion press and the remote parts of the machine being omitted.

Fig. 3 is an opposite end elevation taken in the direction of the arrow 3 of Fig. 1, the remote end portions of the machine being omitted.

Fig. 4 is a partial longitudinal section on the line 4—4 of Fig. 2 in the direction of the arrows, showing a portion of the extrusion press in section and the cutting mechanism in elevation, the cutting mechanism being shown in an elevated position.

Fig. 5 is partial section similar to Fig. 4, but illustrating the cutting mechanism in cutting position.

Fig. 6 is a partial transverse section on the line 6—6 of Fig. 1 in the direction of the arrows, on a larger scale than Fig. 6, to illustrate mainly the extrusion die rollers.

Fig. 7 is a side elevation taken in the direction of the arrow 7 of the adjusting timing gear, the other parts of the mechanism being omitted.

Fig. 8 is a vertical section on the line 8—8 of Fig. 7 in the direction of the arrows.

Fig. 9 is a partial section similar to Fig. 4, showing part of the extrusion press and the die rollers on a larger scale, to illustrate the configuration of such rollers.

Fig. 10 is a plan showing the assembly of the clay working machine and a drive for the various parts of the clay working extrusion machine and the shingle forming machine.

Fig. 11 is a transverse section through a modified construction of extrusion rolls having confining plates at each edge instead of flanges formed integral with the rolls.

Fig. 12 is a perspective view of the shingle illustrating the upper surface.

Fig. 13 is a perspective view of the shingle of Fig. 12, showing the undersurface.

Fig. 14 is a transverse section of the shingle on the line 14—14 of Fig. 13 in the direction of the arrows.

Fig. 15 is a transverse section of Fig. 12 on the line 15—15 of Fig. 13.

Fig. 16 is a perspective view of the upper surface of a modified shingle construction having the same design from the butt to the small end.

The extrusion press designated generally by the numeral 11 may be of the conventional type which is illustrated as having an outer cylindrical casing or housing 12 with a hopper structure 13 for the feed of the clay. This cylinder has a flange 14 at one end to which is attached the converging flanged head 15; this tapering or converging to a rectangular mouth 16. Such mouth has horizontal upper and lower edges 17 and lateral edges 18. (Note Figs. 2 and 4). Secured to the mouth is the extrusion die 19 which has short vertical side edges 20 and upper and lower edges 21. These upper and lower edges converge towards the center so that the measurement at the center as indicated by the measurement line 22 is slightly less than the marginal edge measurement 20. This gives a die orifice which is much longer on its horizontal measurement than on its vertical measurement. Secured to the side edges of the extrusion die and preferably formed integral therewith, there are triangular shaped end projections 23 to confine the clay at the margins of the extrusion die. The clay is pressed outwardly through the die by an extrusion screw 24 mounted on a shaft 25. The screw and the shaft may be of the conventional type and the shaft driven by any suitable mechanism at the end 26 remote from the extrusion die.

The main portion of my machine utilizes a frame 30 which may be of any suitable type and has upper and lower extrusion die rollers 31 and 32 mounted therein. These die rollers are mounted on shafts 33 and 34 respectively and suitably journaled in the frame 30. Each of these die rollers has a marginal flange 35, the triangular projections 23 being aligned with these flanges, the flanges preferably contacting and the projections thus preventing clay being forced outwardly at the margins of the die rolls. The configuration of the surface of these rolls is such as to form the particular design on the upper and on the undersurface of the shingle.

The upper die is illustrated as having somewhat irregular longitudinal grooves 36 and between these grooves there are irregular ridges, the general direction of the ridges and the grooves being circumferential of the die. Another section of the upper die has criss-cross intersecting ridges and grooves 37, the remainder of the die having a smooth surface 38. In this upper die the outermost measurement of the longitudinal ridges of the portion 36, the criss-cross ridges of the portion 37 and the smooth surface 38 are substantially all at the same radial distance from the center of the axis of the die as indicated by the radial measurement 39 in Fig. 9. This is designed so that the upper surface of the extruded shingles as to the tops of the ridges and the smooth section will be in a horizontal plane.

The lower die roller 32 has a transverse depression 40 (note Figs. 6 and 9) and from this extends circumferential grooves 41 spaced apart by circumferential ribs 42. The circumferential grooves gradually decrease from their commencement adjacent the transverse depression 40 and merge at 43 to the smooth cylindrical surface 44. The cylindrical section is at the same radius indicated at 45 as the outer periphery of the ribs 42. Thus as these dies are driven in rotation at a constant speed, the direction of rotation is indicated by the arrows 46 and 47 of Fig. 9.

The type of shingle illustrated is designated generally by the numeral 50 and is illustrated in detail in Figs. 12, 13, 14, and 15. In this construction the upper or exposed face 51 of the shingle is formed by the section 36 of the upper die roller 31. The section having the criss-cross ribs 52 is formed by the cross ribbed section 37 of this upper die and the smooth surfaced end section 53 is formed by the smooth or cylindrical surface 38 of the upper die. The lower die forms a transverse somewhat semi-cylindrical bead 54 (note Figs. 4 and 5). At this bead a base cut is made in the manner hereinunder described, giving a cut edge 55 thus forming two semi-beads 56 and 57. The semi-bead 56 is at the base or lower end of the grooves 58 (note Fig. 13) formed by the ribs 42. The grooves 41 of the lower roller 32 form the longitudinal ribs 59. The die rollers are so shaped that the ribs decrease in height or thickness while the ribs 47 on the lower die roll are of such shape that the thickness of the shingle on the measurement 60 is substantially constant from adjacent the bead 54 to the thin end 61 of the shingle (note Figs. 4 and 5).

Due to the fact that there is a greater quantity of clay passing between the die rolls adjacent the butt end than at the small end 61 of each shingle, and the die rolls operate at the same or constant surface speed, there is a slight slippage between the extruded clay and the die rolls, causing an elongated deformation of the design 51 on the upper surface of the shingle indicated by the numeral 62 (note Fig. 12). Also the criss-cross ribs are deformed slightly at the portion 63 adjacent the smooth surfaced section 53. In the operation of the machine, a secondary cut is given at the position 64 (note Fig. 5) spaced from the first cut 55 through the bead 54. This forms a waste section 65 (note Fig. 1). The waste section may be changed in length in order to change the overall length of the shingle. The shingle thus has a vertical base end forming the exposed lower edge indicated at 66 in Figs. 12 and 13, two parallel side edges 67 and the small upper edge 68; the edges 66 and 68 being parallel. During the severing of the shingle to make the cut at the base and to trim off the waste end, perforations 69 are also formed in the shingle adjacent the small end 68. These form nail holes for securing the shingle to a roof or similar structure.

In order to form this type of shingle I employ a first endless belt conveyor 75 which operates over pulleys 76 on the pulley shaft 77 and a complementary pulley 78 on the pulley shaft 79. (Note Figs. 1 and 4.) The upper run 80 of this conveyor is driven at a higher surface speed in the direction of the arrow 81 than the peripheral die face of the pulleys. Thus there is a slight pull on the portion of the clay forming the shingle after its extrusion through the die rollers. This pull or tension is sufficient so that the die rollers do not have to force the shingle along the upper run of the endless belt and such slight pull tends to facilitate the slight slippage of the clay when extruded between the die rolls in order to form the slight deformation on the upper side of the shingle. Moreover, this slight increase in speed causes a slight separation or gap indicated at 82 between two contiguous shingles, this gap being formed at the cut 55 through the full bead 54 (note Figs. 4 and 5).

The shingles after being cut during their travel on the endless conveyor 75 to the desired length by the mechanism hereinunder detailed, are transferred to a second endless belt conveyor 85. This operates over a first set of pulleys 86 on a pulley shaft 87 (note Fig. 1) and an end pulley 88 having a pulley shaft 89. This belt is driven with its upper run 90 operating at a higher surface speed in the direction of the arrow 91 than the upper run 80 of the endless belt 75. This belt 85 is usually much longer than the belt 75 in order to develop a considerable spacing of the succeeding shingles and allow sufficient time for their transfer by flat shovels to trays or the like for subsequent transference to the kilns for the burning treatment and also to allow time for the removal of the severed waste sections 65.

A bridging plate 95 is located between the lower die roll 32 and the pulley 76 (note Figs. 4 and 5) and extends transversely at least the full length of the die rolls to support the extruded shingle on its transfer from the die rolls to the upper run 80 of the belt 75. This also forms an abutment for the initial cut which forms the cut 55 through the whole bead 54. The mechanism for making this cut is hereinunder detailed. There is also a second bridging plate 96 between the discharge end of the upper run 80 of the endless belt 75 and the upper run 90 of the second endless belt 85; this plate being located between the pulleys 78 over which the belt 75 operates and the pulley 86 over which the belt 85 operates. This bridging plate is supported in the frame of the machine and extends at least the full width of the conveyor belts. This bridging plate 86 supports the shingle in its transfer from the upper run 80 of the first belt 75 to the upper run 90 of the second belt 85.

When it is desired to split the shingles longitudinally to make these narrower than the standard width, I employ a splitting mechanism 100 which employs a rotary splitting knife 101 made in the form of a disk suitably weighted mounted on a cutter knife shaft 102; the shaft being journaled in arms 103 hinged or pivoted at 104 to the frame of the machine. This splitting knife or disk is located to operate above the bridging plate 96 and it will be obvious that if desired one or more of these rotary splitting knives may be utilized if it is desired to split the shingle longitudinally in two parts or more. However, as above mentioned the use of this splitting knife is optional and is not used where the full width shingle is desired. The splitting knives also split the waste segments 65.

The cutting mechanism for giving the transverse cuts is designated generally by the assembly numeral 110 (note Figs. 1, 3, 4 and 5). This mechanism employs a blade holding frame 111. This may be formed of angle-shaped members 112 having pivot pins 113 extending therethrough. These pins each have a lower swivel head 114 mounted thereon between the angles. the swivel head having a hub 115 through which the pivot pins extend and a boss 116 (note Figs. 1 and 3). To each boss is secured a link 117 (note Figs. 1 and 3); these being preferably threaded in the boss 116 and secured by lock nuts 118.

The upper ends of the links 117 are mounted in an upper swivel head 120, each of which has a transverse or horizontal hub 121 fitting on a crank pin 122 which crank pin is secured to a counter-balanced crank arm 123. Each crank arm is attached to a crank shaft 124 and has a counter-weight 125 (note Figs. 1 and 3). The crank pins have a head 126 and are secured by nuts 127. Extending downwardly from each hub 121 there is an arm 128 having a sleeve 129 secured integral therewith, in fact, the hub arms and sleeve are preferably formed integral and through each sleeve extends the link 117 secured by nuts 130 at their upper end. Adjusting nuts 131 forming collars are threaded on each link 117 and between the sleeve 129 and the collar formed by the nuts 131 there is a compression spring 132 on each link, thus giving a resilient and downward pressure to the blade carrying frame 111.

The blade carrying frame has a first fixed knife 135, this preferably being in the form of an angle and having a horizontal cutting edge 136. This blade is positioned adjacent the die rollers and forms the base cut in a manner hereinunder detailed. A secondary adjustable blade 137 has a cutting edge similar to the first blade and is adjustable on the blade carrying frame 111 so that the distance between the blades 135 and 137 may be adjusted to form the cut 64 which severs the small end 68 of the shingle at variable distances from the base cut 55 in order to vary the length of the shingles. This blade also varies the length of the waste piece 65. In order to form the nail holes 69 a pair of punches 138 are secured to the blade carrying frame 111 preferably to the angles 112. These punches are tubular and may be adjusted at variable distances from the blade 135 and also from the blade 137 so that the nail holes 69 may be the desired distance from the small end 68 of the finished shingle. The material perforated from the clay by these punches is pressed upwardly through the tubular punches and discharged on the top of the shingles as they pass through the cutting mechanism.

The mechanism for guiding the cutting assembly employs a cam guide designated by the assembly numeral 140 (note Figs. 1 and 1a). This cam guide employs a rigidly mounted vertical frame at one side of the machine and has a downwardly sloping cam path 141 defined by the guide structures 142 and 143, and a vertical guide path 144 defined by the vertical surfaces 145 and 146. There is a longitudinal cam path 147, this being open at the bottom 148 and defined at the top by the tilting restraining plate 149. This is pivoted at 150 and has a normal horizontal flange 151, an arcuate end 152, a stop shoulder 153, adapted to contact the stop 154 attached to the structure 143. A cam channel 155 for upward movement is defined by the concentric guide surfaces 156 and 157, the surface 156 having a vertical guide wall 158 and the surface 157 having an inwardly turned end 159. The guide walls 143 and 157 join at the top in a curved connection end 160. A guide latch 161 pivoted at 162 has a normal horizontal flange 163 and a vertical flange 164.

The cam guide channel having the various components above described is for guiding a guide pin 165 which is rigidly secured to the blade holding frame 111 being attached to the vertical flange of the angles 112. The end of this pin extends into the cam channels above detailed. If it were not for this guide channel and the guide pin, on account of the links 117 being suspended by the pivot hub 121 from the rotating crank arms 123, these links would always depend in a parallel and vertically from their pivots to the cranks. The two cranks 123 rotate at the same speed in the direction of the arrow 166, hence the guide pin 165, were it not confined by the cam channels would follow the circular path indicated in dotted lines at 167 (Fig. 1a), the center of rotation being indicated by the center point 168. The equivalent circle 167 is indicated dotted on Fig. 1. It is desired that when the links reach the point 169 that the cuts be made by the blades 135 and 137 that these blades have a vertical movement during their travel to the point 170 on their circle of rotation. This causes them to cut to a depth measured by the cord line 171 between the points 169 and 170 and the lowermost point 172 occupied by the pin 165. This develops a vertical movement indicated by the measurement 173 which is sufficient to cut through the clay of the shingles and form the cut 55 at the full bead 54 and also to make the secondary end cut 64.

The speed of rotation of the cranks 123 and hence of the cutting assembly during its cutting stroke is synchronized so that the guide pin 165 travels between the points 169 and 170 on the circle 167 at the same rate as the clay shingle advances from the extrusion press and on the upper run 80 of the first conveyor 75. Thus as the guide pin moves at this rate the cutting blades manifestly must move at the same speed relative to the extruded clay forming the shingles. The pin 165 is guided vertically prior to the blades entering the clay by the vertical channel 144. After the blades are withdrawn at the point of travel indicated at 170, the pin follows the path indicated by the dotted lines 174 and engages the horizontal flange 151 of the restraining plate 149. This plate if desired is guided by a pin 175 operating in an arcuate slot 176 in the fixed frame structure. If the pin 165 rises too high and engages the inwardly curved surface 159, it is guided into the channel 155. At the top of the stroke of this channel 155 it contacts the guide latch 161 and is lifted and the pin is guided into the downwardly sloping channel 141, this latch preventing the pin from again entering the channel 155 and being lowered in a reverse direction. During the downward travel in the channel 141, as this is displaced from the circle of rotation 167, the links 117 are inclined from their pivots to the cranks 123, towards the discharge end of the machine, but during this part of the travel the cutting blade supporting frame is elevated high above the belt and the shingles being extruded. It will thus be seen that when the machine as to the extrusion and to the movement of the cutting frame are properly synchronized, that the first cutting blade 135 always cuts through the butt end of the shingle to be formed, forming the main severing cut 55 at the exact center of the enlarged or whole bead 54 (note Figs. 4 and 5).

In order to lubricate the upper surface of the first conveyor, I provide a friction driven lubricating roll 180 (note Figure 1) which dips into a lubricating tank 181 and deposits the lubricant on the lower run of the first conveyor belt 75. This lubrication of the belt thereby facilitates the slippage of the strip forming the shingle as it is passed through the extrusion press. The extrusion rolls are also lubricated by lubricant jets 182 and 183 (note Figs. 6 and 9).

The drive mechanism I have developed for the rolls and the conveyors, employs a belt pulley 185 indicated as driven by the belt 186. This drives the shaft 187 of a variable speed belt drive 188 which may be of a standard character, thus driving the shaft 189. This has a pinion 190 meshing with a large gear 191 (note Fig. 2) secured to the shaft 192 of the upper extrusion roll 31. The lower roll is driven by a gear drive 193 on the shaft 192 to the gear 194 on the shaft 195 of the lower extrusion roll 32.

The timing of the cutters in reference to the rolls is by the drive connection designated by the assembly numeral 196. On the shaft 192 there is a fixed or keyed sleeve 197 (Figs. 7 and 8) having a flange 198 and secured to the flange there is a sprocket wheel 199 having slots 200 through which extend the clamping bolts 201, thus allowing a considerable displacement of the sprocket wheel 199 in reference to the sleeve 197 and hence the shaft 192. A sprocket chain 202 operates two sprockets 203 and 204, operating the crank shafts 124. The sprocket chain also passes over an idler sprocket 205.

Thus it may be seen that the timing of the actuation of the cranks for the cutter may be properly synchronized with the extrusion of the clay for it is essential that the main or primary cut 55 be made exactly through the center of the full bead or rib 54. The circumference of the die surface of the extrusion rolls is slightly less than the lineal length of the shortest shingle between the successive full beads 54. There is a slight elongation of the small end portion of the shingle in reference to the butt end, due to the butt end having much thicker ribs and hence a larger cross sectional area, even when the peripheral speed of the extrusion rolls is the same as the lineal speed of the ribbon of clay. With my present construction it is desired to maintain the speed of the extrusion screw constant and thus maintaining a substantially constant pressure on the extruded ribbon of clay through the die 16 and the bite of the extrusion roll.

To form longer shingles the speed of the whole mechanism may be retarded by the variable speed drive 188. This causes the extrusion die rolls to have a slower peripheral speed in reference to the lineal extrusion speed of the ribbon of clay. Therefore there is a slight elongation of the patterns of the upper surface of the shingle. This gives a desirable effect as this pattern may thus be slightly varied without changing the upper die roll. Manifestly for shingles longer than the shortest for which the machine is designed, the secondary cutting knife must be repositioned.

In the assembly of Fig. 10 I illustrate a suitable driving connection between the clay working machine with the extrusion press and the shingle forming machine, to illustrate suitable mechanism for changing the lineal speed of extrusion of the plastic ribbon from the extrusion press 11. In this illustration the extrusion press is shown as being supplied with clay by a pugmill 210 having a rotating shaft 211 with cutting blades 212 therein. The pugmill is supplied with material by an endless conveyor belt 213. This latter is loaded by means of a hopper 214 having an adjustable gate 215.

The drive mechanism is illustrated as having a line shaft 216, a first belt drive 186 to the pulley 185 which forms the main drive connection to the extrusion rolls and all of the mechanism for pressing, cutting and feeding the shingles. The auger 25 of the extrusion press has a geared connection 217 to a belt drive 218 from the line shaft 216. The feeding belt 213 has an operating shaft 219 with a belt drive 220 from the same line shaft. The shaft 211 of the pugmill has a geared connection 221 to the belt drive 222 connecting to the same line shaft. With this mechanism it is possible to maintain a constant drive to the feeding belt 213 and thus to the pugmill 210 which supplies material to the auger 25 of the extrusion press 11. A constant speed drive may thus be given to the pulley 185 of the shingle forming mechanism and this machine has the variable speed drive 188. Therefore the drive to the extrusion rolls may be retarded while the feed of the ribbon through the extrusion orifice 16 is maintained at a substantially constant lineal speed. However, should it be desired to change the relative lineal speed through the extrusion rolls, the speed of the auger could be varied somewhat in the manner set forth in my patent application above mentioned.

Another manner to increase the lineal speed of the material extruded through the orifice 16 is by varying the opening of the gate 215 of the hopper 214. Thus I provide a considerable flexibility in the operation of my present entire mechanism, by either varying the speed of the extrusion rolls, the speed of the auger or the quantity of material fed to the auger. I may supply and work the clay prior to its reaching the extrusion press in accordance with my prior Patent No. 1,907,731, Clay tempering machine, patented May 9, 1933, or in accordance with the patent to J. C. Schaffer, No. 1,419,946, patented June 20, 1922, for Feeder. There are also a number of types of feeding machines on the market which may be used with my shingle forming machine.

In Fig. 11 I illustrate a vertical transverse section through a modified construction of extrusion rolls. In this I have an upper roll 223 and a lower roll 224; these may have the desired configuration on their surfaces. At each side of these rolls there is a fixed plate 226', such plates connecting with the mouth or fixed extrusion die of the extrusion press to confine the ribbon of plastic material at the marginal edges of the rolls. These plates therefore are a substitute for the flanges 35 on the rolls as shown in Fig. 6.

In Fig. 16 I illustrate a modified type of upper face for the shingles, the shingle as a whole being designated by the numeral 225 having the butt end 226 and the small end 227. In this case the design 228 on the upper surface is preferably formed of grooves and ridges similar to the design indicated at 51 in Fig. 12. When these extend from one end to the other face of the shingle they give the appearance of hand made shakes. In the construction of the surface of Fig. 16, when the ribbon of clay is extruded at a higher lineal speed than the peripheral speed of the extrusion rollers, there is a slippage which causes a slight drawing out of the design on the upper surface, so this does not have absolutely true markings corresponding with accuracy to the design on the upper extrusion roll.

It will be noted that a characteristic feature of the shingle formed by my machine and the method of operation is that it is quite light, the main body of the web portion between the ribs being of substantially constant thickness, except for variations caused by the upper face design. The ribs taper in thickness from the butt towards the small end, the butt having the thickened bead but the ribs are preferably of the same width from one end to the other. Therefore in causing an elongation in extrusion to develop longer shingles, the slippage of the clay through the grooves of the lower extrusion roller forms clear cut ribs.

As above described, in the type of shingle of Fig. 12, the design at the butt and the small end may be changed by varying the position of the upper roll in reference to the lower roll so as to produce shingles having a different exposed surface when laid on a roof.

Various changes may be made in the details of construction without departing from the spirit or scope of the invention as defined by the appended claims.

I claim:

1. In a clay working machine, means to form a moving strip of plastic material combined with a cutter mechanism having a blade holding frame, a pair of blades mounted on said frame, a pair of parallel links pivotally connected to the frame, a crank connected to each link, means to rotate the cranks in a circular motion, a fixed cam, a guide pin on the blade holding frame, the said guide pin and the cam guiding the blades in making an incision and in being withdrawn from the strip to be always at right angles to the axis of the strip, the said links and cranks permitting the blade holding frame to move at the same lineal speed as the strip while making the incisions and being withdrawn.

2. In a clay working machine as claimed in claim 1, the cam having a cam path with the pin fitting therein and movable restraining means mounted to obstruct the path of the pin, said restraining means being moved by the pin and being operative to prevent the pin having a reverse motion in the cam path.

3. In the method of making plastic articles, comprising extruding a strip of plastic material, supporting the extruded strip beyond the point of extrusion and exerting a slight tension while supporting the strip to prevent the strip buckling under the pressure of extrusion, during the movement of the strip making a first incision adjacent the point of extrusion to sever the strip into a plurality of fixed lengths and at the same time making a secondary incision spaced from the first incision to divide each fixed length into two portions, one portion forming the article to be made and the other portion being a waste.

4. In a clay working machine, means to form a moving strip of plastic material combined with a cutter mechanism having a blade holding frame, a pair of blades mounted in said frame, a pair of parallel links pivotally connected to the frame adjacent opposite ends thereof, means to develop a combined up and down and horizontal movement of the links, a fixed cam, a guide pin on the blade holding the frame, the said guide pin and the cam guiding the blades in making an incision and in being withdrawn from the strip to be always at right angles to the axis of the strip, the means for developing the motion of the links being operative whereby when the blade holding frame moves in the same direction as the strip, the strip and the frame have the same lineal speed while the blades are making the incision and being withdrawn from the strip.

5. In a clay working machine as claimed in claim 4, the cam having a cam path with the pin fitting therein when the blades are out of engagement with the strip, a tilting restraining plate having a horizontal guide element, the pin passing below said element when the blades engage the strip, the said element being adapted to be moved upwardly by the pin and the restraining plate being operative to prevent a reverse motion of the pin in the cam path.

6. In a clay working machine as claimed in claim 4, the cam having a cam path with the pin fitting therein when the blades are out of contact with the strip, said path having an upward curved lead and a downward substantially straight sloping lead, there being a movable guide latch at the point of junction at the top of the curved and the inclined straight leads, said guide latch being moved by the said pin and the guide latch being adapted to divert the pin downwardly into the sloping straight channel.

7. A clay working machine having means for extruding a ribbon of clay, a first conveyor receiving the ribbon and movable at the same longitudinal speed as the ribbon, a cutter mechanism having a first and a second blade, said mechanism having a pivotal mounting for the blades, such pivotal mounting being transverse to the direction of movement of the ribbon, means to operate said mechanism to develop a parallel motion of the blades to make incisions in the ribbon, the blades while the incision is being made, being movable at the same speed as the ribbon of clay and forming the incisions at right angles to the direction of movement of the ribbon, the cutter mechanism having means to withdraw the blades at the end of the incision while the blades are travelling at the same speed as the ribbon and means to return the blades above the ribbon to their initial position for a second set of incisions, an outfeeding conveyor movable at a higher speed than the speed of the ribbon and of the first conveyor, the blades being adapted to cut the ribbon into shingle lengths and to also cut a small waste piece of ribbon, the second conveyor being adapted to separate the successive shingle lengths and the waste pieces.

8. A clay working machine as claimed in claim 7, the extruding means including a pair of complementary rollers through which the ribbon extends having a configuration for forming a transverse rib and longitudinal grooves extending from the rib and a section adjacent the rib without longitudinal grooves, the blades including a first blade positioned to make an entering incision adjacent the rolls and a second blade adjustable longitudinally as to spacing from the first blade, means to time the incisions of the blades with the rolls whereby the first blade always makes an incision through the rib of the shingle at one end of the grooves and the second blade always makes an incision through the portion of the ribbon without grooves adjacent a leading rib whereby the shingle length is always provided with grooves terminating in positions spaced from the ends of the shingle.

9. A clay working machine having an extrusion means for a ribbon of clay including a pair of complementary rollers with their axis transverse to the direction of movement of the ribbon, said rollers having a configuration to form a series of transverse ribs, a series of longitudinal grooves, the grooves terminating spaced from a transverse rib, a cutter mechanism having pivotally mounted cutters, the pivots being transverse to the direction of movement of the ribbon, the cutters including a first and a second blade, means to move the cutter mechanism for the blades to make the initial movement of an incision while closest to the rolls, the blades being movable away from the rolls at the same speed as the movement of the ribbon, the cutter mechanism and the rolls having a timing interconnection whereby the first blade always makes an incision through the rib to form one end of the shingle and the second blade always makes an incision through the portion of the ribbon adjacent another rib and spaced from the termination of the grooves, thereby forming a shingle length with the grooves closed at both ends, the two incisions also forming a waste section of the ribbon.

DAVIS BROWN.